United States Patent [19]
Wolfram

[11] Patent Number: 4,781,522
[45] Date of Patent: Nov. 1, 1988

[54] TURBOMILL APPARATUS AND METHOD

[76] Inventor: Norman E. Wolfram, 216 Millers Falls Rd., Turners Falls, Mass. 01376

[21] Appl. No.: 9,241

[22] Filed: Jan. 30, 1987

[51] Int. Cl.$^4$ .............................................. F03D 1/02
[52] U.S. Cl. ..................................... 415/1; 415/2 A; 415/4; 416/121
[58] Field of Search .................. 415/2A–4A, 415/DIG. 1A, 1; 416/43 A, 121 A

[56] References Cited

U.S. PATENT DOCUMENTS

| | | | |
|---|---|---|---|
| 1,312,021 | 8/1919 | Dickinson et al. | 415/4 A |
| 1,578,923 | 3/1926 | Schlotter | 415/2 A |
| 3,339,078 | 8/1967 | Crompton | 415/2 A X |
| 4,075,500 | 2/1978 | Oman et al. | 415/2 A X |
| 4,080,100 | 3/1978 | McNeese | 416/121 A X |
| 4,087,196 | 5/1978 | Kronmiller | 415/2 A |
| 4,132,499 | 1/1979 | Igra | 415/2 A |
| 4,166,596 | 9/1979 | Mouton et al. | 415/2 A X |
| 4,370,095 | 1/1983 | Sleeper | 415/DIG. 1 A X |

FOREIGN PATENT DOCUMENTS

| | | | |
|---|---|---|---|
| 256035 | 11/1963 | Australia | 415/2 A |
| 3132404 | 5/1982 | Fed. Rep. of Germany | 416/43 A |
| 3323200 | 1/1985 | Fed. Rep. of Germany | 415/2 A |
| 989170 | 9/1951 | France | 415/2 A |
| 1007883 | 5/1952 | France | 415/4 A |
| 2422047 | 12/1979 | France | 415/3 A |
| 2492467 | 4/1982 | France | 416/9 |
| 527585 | 1/1955 | Italy | 415/3 A |
| 1504911 | 3/1978 | United Kingdom | 416/121 A |
| 2071774 | 9/1981 | United Kingdom | 415/3 A |

*Primary Examiner*—Everette A. Powell, Jr.
*Attorney, Agent, or Firm*—Walter W. Burns

[57] ABSTRACT

Turbomill apparatus and method allowing power generation at low velocities of ambient medium, with an anti-stall characteristic of continually rising power output with rising speed at input medium at the same time being rugged to withstand high velocity ambient medium wherein a main rotor receives an input from an ambient medium travelling at a low velocity, a secondary rotor is impacted at least by the ambient medium for the purposes of rotating a tertiary rotor disposed in traveling relationship with regard to the main rotor, the tertiary rotor serving to exhaust the space proximate the output of the main rotor, thereby lowering the pressure at the output of the main rotor, whereby the main rotor can achieve start-up and maintenance of rotation at velocities of the ambient medium which, absent the apparatus of the invention, would be insufficient to cause start-up and continuance of rotation of the main rotor.

23 Claims, 3 Drawing Sheets

TURBOMILL APPARATUS AND METHOD

BACKGROUND AND SUMMARY OF THE INVENTION

The invention relates to fluid medium augmentation employed in a turbomill apparatus and method for extracting energy from a fluid medium. Exemplary of such apparatus and method are those which employ rotors acted upon by the medium to produce rotational power.

THE PRIOR ART

U.S. Pat. No. 1,695,751 to Wiberg shows, in FIG. 1, a radial flow turbine having multiple flow channels.

U.S Pat. No. 2,726,508 to Halford, et al. shows, in FIG. 1, a centrifugal compressor with an impeller H1 driven at half or rather less than half of the speed of an impeller D.

U.S. Pat. No. 3,038,307 to Oprecht shows the use of planetary gear configurations, FIGS. 2, 5, 6 and 7, for linking impellers.

U.S. Pat. No. 3,214,990 to Jekat also shows a planetary gear configuration for operation of impeller systems.

U.S. Pat. No. 3,224,194, to De Feo, et al. shows, in FIG. 1, a multiple rotor configuration mechanically interconnected.

U.S. Pat. No. 3,282,053 to Messerschmitt shows, in FIGS. 1 and 2, impeller systems wherein each impeller accepts input which is distinct from that of another.

U.S. Pat. No. 3,462,953, to Wilde, et al. shows a multiple rotor system with multiple intakes in FIG. 1.

U.S. Pat. No. 3,729,957 to Petrie, et al. shows a multiple impeller system with multiple intakes.

U.S. Pat. No. 4,453,885, to Denton shows a counter deflection part device.

U.S. Pat. No. 4,453,886 to Wilson shows a centrifugal pump-compressor with a chamber adapted to rotate about a predetermined axis and vanes extending radially with respect to such axis adapted to impell a fluid at least in the radial direction of the chamber.

British Pat. No. 518,042 to Aktiebol aktiebolaget Ljungstroms Angturbinshows a double rotation type elastic fluid turbine.

German Pat. No. 531,056 to Allmanna Svenska shows a multiple rotor configuration.

Aerodynamic augmentation has been researched previously, however such investigations have concentrated primarily on the application of wake diffusers. These diffusers are rather massive conical shaped structures which enclose the turbine rotor blades and expand in area downstream of the intake.

Thus, to state in general terms, one of the problems previously encountered, the prior art has been faced with the difficulty that the velocity of the medium impacting the impeller must be substantial before start up and maintenance of impeller rotation can be effected. It will be appreciated that when physical conditions admit only of a lower velocity than that which will move the impeller, significant amounts of energy are not available to the impeller system.

The prior art has also suffered from the fact that apparatus configured to be most efficient from an energy transfer standpoint may be excessively fragile such that, when operated in an ambient medium having extraordinarily high velocities, damage to the apparatus results.

A machine with aerodynamic augmentation may comprise a main rotor, mounted either fixed to, or for rotation with respect to, the main shaft, disposed within a shroud and caused to rotate by an input medium, thereby generating an output medium. A secondary rotor accepts medium received exterior to the shroud and also medium received as output of the main rotor. The secondary rotor has first blades responsive to the medium exterior to the shroud for causing rotation of the secondary rotor and second blades of a same or different configuration which serve to exhaust the output of the main rotor for the purpose of lowering the pressure in the output medium of the main rotor.

BRIEF DESCRIPTION OF THE INVENTION

The invention has general application in many environments exemplary of which are those employing windmills.

The invention is directed to a system for fluid medium or wind augmentation of the velocity of rotation of a rotor configuration using a moving medium as input, the rotor configuration being designed to admit of start up of rotation and maintenance of rotation at low ambient velocities of a medium at the same time possessing a rugged structural configuration capable of withstanding high velocities of the ambient medium.

Fluid or aerodynamic augmentation involves the augmentation of the free wind velocity at atmospheric pressure upstream of the machine. Devices and aerodynamic principles are used which cause the acceleration of the free wind velocity upstream of the machine by an induced reduction of static pressure downstream of the turbine rotor blading. These features result in a higher mass air flow rate than that which would normally occur in a conventionally bladed, unaugmented wind machine.

Among the benefits of such an approach are:

(1) increase of the machine output annual load factor over that of a conventionally bladed machine, and (2) increase of the machine power output compared with a conventionally bladed machine of the same swept blade area.

The importance of the first benefit referred to is that an augmented machine characteristically begins to produce usable power at a lower windspeed than a comparable prior art machine lacking the invention. Thus for a given site, the machine of the invention is on line and producing energy more hours of the year resulting in greater revenues than a conventional machine.

The second benefit of such augmentation as stated, is that a machine embodying the invention may have a higher power rating than a comparable machine of the prior art lacking the invention but of the same blade diameter. Given a particular power rating, a smaller diameter rotor may be used in an augmented machine as compared to a larger bladed comparable prior art wind turbine of the same power rating. The augmented machine thus provides reduced blade stress with concomitant reduced manufacturing costs.

In an embodiment of the invention, a main rotor disposed within a shroud with stator powers an output shaft. A secondary rotor, which in one alternative embodiment may rotate freely about said output shaft, accepts medium exterior to the shroud to cause rotation of a tertiary rotor located interior to the shroud employing a transmission means which increases the rotational speed of the tertiary rotor with respect to the secondary rotor. Alternatively, the secondary rotor may be fixed with respect to the main shaft. The tertiary rotor receives the output of the main rotor for exhausting the output of the main rotor into the ambient medium.

In another embodiment of the invention having leading and trailing shrouds, a main rotor disposed within the leading shroud is caused to rotate by an input medium, a secondary rotor, fixed to main shaft or alternatively mounted for rotation with respect to the main shaft, accepts as input the medium received exterior of the shrouds, the secondary rotor serving to activate a tertiary rotor disposed substantially between the shrouds, which tertiary rotor accepts the output medium of the main rotor and transmits the output medium from the main rotor to the secondary rotor via a path exterior to the trailing shroud and by means of the embodiments disclosed, the capability of the main rotor to start up and maintain rotation at low velocities of ambient medium is enhanced compared to a conventional rotor without the invention, the rotors of the invention with their attendant structure providing a rugged structure to withstand high velocity ambient media.

Whether a secondary rotor is fixed or free to rotate with respect to the main shaft, among other things, depends upon the desired operating conditions and, in particular ambient media velocities and desired rotor rpm.

It is therefore an object of the invention to provide an improved impeller configuration which avoids the difficulties found in the prior art.

It is a further object of the invention to provide an apparatus which provides start up of rotation of rotors at low velocities of ambient, medium at the same time providing a rugged structure resisting damage at high velocities of ambient medium.

Another object of the invention is the provision of a machine which will start turning at a very low wind speed and convert the energy in all wind regimes at efficiencies significantly higher than the efficiency of known machines.

It is another object of the invention to provide an apparatus having an anti-stall characteristic with continuously rising power as wind speed increases.

It is another object of the invention to provide an apparatus which increases the effectiveness of air at a given velocity for powering a turbine by a factor substantially two times or more as compared to that of single bladed turbines of the prior art of same diameter.

It is another object of the invention to provide an apparatus which is constructed of relatively inexpensive materials, without the need for delicate or critical balance, strength and stress considerations.

It is another object of the invention to provide an apparatus which is virtually indestructible in naturally occurring wind regimes, without the need of braking or turning out of the wind.

It is another object of the invention to provide an apparatus which will convert energy in any naturally occuring wind at a predictable and linear power output with virtually no upper limit and substantially no relative power loss at high power outputs.

It is another object of the invention to produce an apparatus which can endure and operate unattended in cold, snow, icing and extreme wind velocity conditions with little or no need for snow and ice removal systems.

It is another object of the invention to produce an apparatus which will produce electric or mechanical power at a much lower capital and maintenance cost than obtains for known prior windmills.

It is an object of the invention to provide an apparatus for generating power from a moving medium and having at least a first shroud means, a stator means fixedly mounted within the first shroud means for receiving at least a portion of said medium, a main rotor means mounted on a main shaft means for rotation within the first shroud means and receiving said portion of said medium from the stator means to produce an output medium having a predetermined pressure within said shroud means and comprising a second rotor means responsive to a second portion of said medium for reducing the pressure of said output medium by means of a tertiary rotor means.

It is another object of the invention to produce an apparatus for generating power from a moving medium having at least a first shroud means, a stator means fixedly mounted within the first shroud means for receiving at least a portion of said medium, a main rotor means mounted in a main shaft means for rotation within the first shroud means and receiving said portion of said medium from the stator means to produce within the said shroud means an output medium having a predetermined pressure and a second rotor means responsive to a second portion of said medium exterior to said shroud to power a third rotor for reducing the pressure of said output medium within said shroud means.

It is another object of the invention to provide an impeller configuration comprising a leading shroud having a trailing edge, a stator means fixedly mounted with respect to the leading shroud, main rotor means mounted for rotation with respect to the stator means by means of a main shaft, a trailing shroud having a trailing edge and a leading edge, the leading edge of the trailing shroud being spaced from the trailing edge of the leading shroud, secondary rotor means disposed proximate the trailing edge of the trailing shroud and rotatably mounted to the main shaft, and tertiary rotor means responsive to rotation of the secondary rotor means for actuating a medium received as output from the main rotor means to transmit all or alternatively at least a portion, of said medium between the trailing edge of the leading shroud and the leading edge of the trailing shroud in response to rotation of the secondary rotor means.

It is a further object of the invention to produce a power generation apparatus having main, secondary and tertiary rotor means wherein the tertiary rotor means comprises a hollow shaft surrounding a main shaft, the hollow shaft being responsive to rotation of the secondary rotor means and wherein said secondary rotor means has multiple blades disposed radially about the main shaft, a hub mounted to the multiple blades and surrounding the main shaft and responsive to rotation of the hollow shaft.

It is another object of the invention to provide a power generating apparatus wherein one or more shrouds are supported fixedly with respect to each other which shrouds may be rotated together with the shroud support about a horizontal axis and/or about a vertical axis.

It is another object of the invention to provide a power generating apparatus comprising a main shroud enclosing a primary rotor with a secondary rotor at the trailing edge of the shroud, the shroud being tapered aerodynamically to increase velocity of the medium exterior to the shroud and thus increase the energy available from the medium exterior to the shroud in impacting the secondary rotor.

It is another object of the invention to provide a power generating apparatus wherein a shroud encompasses a stator mounted thereto, a main rotor is mounted to a main shaft, the shaft being rotatably mounted with respect to the stator, a secondary rotor is disposed at a trailing edge of the shroud and rotatably mounted with respect to the main shaft for actuation by air exterior to the shroud, a tertiary rotor interior to the shroud receives medium output from the main rotor and there is provided means for imparting rotation to the tertiary rotor in response to rotation of the secondary rotor.

It is another object of the invention to create a power generation apparatus having a main, a secondary and a tertiary rotor wherein means for imparting rotation to the tertiary rotor comprises means for imparting a higher rate of rotation to the tertiary rotor compared to the rate of rotation of the secondary rotor.

It is a further object of the invention to provide a power generation apparatus having a main rotor, a secondary rotor and a tertiary rotor and comprising means for imparting a higher rate of rotation to the tertiary rotor with respect to the secondary rotor by means of a planetary gear system.

It is yet another object of the invention to provide a method for producing mechanical rotation from a flowing medium comprising the steps of imparting rotation to a first rotor employing a portion of said flowing medium, imparting rotation to a second rotor employing a second portion of said medium exclusive of said first portion of said medium together with output medium received from said first rotor, imparting rotation to a third rotor in response to rotation of said second rotor and accelerating output medium from said first rotor in response to rotation of said third rotor.

It is another object of the invention to provide a method for producing mechanical rotation from a flowing medium comprising the steps of imparting rotation to a first rotor employing a portion of said flowing medium, imparting rotation to a second rotor employing a second portion of said medium exclusive of said first portion of said medium and employing output medium received from said first rotor, imparting rotation to a third rotor in response to rotation of said second rotor, and accelerating medium output from said first rotor in response to rotation of said third rotor.

It is another object of the invention to provide a method for producing mechanical rotation from a flowing medium comprising the steps of imparting rotation to a first rotor employing a portion of said medium, imparting rotation to a second rotor employing a portion a second portion of said medium exclusive of said first portion of said medium, imparting rotation to a third rotor in response to said rotation of said second rotor and accelerating output medium from said first rotor in response to rotation of said third rotor to exhaust the medium from the first rotor to an ambient medium.

It is another object of the invention to provide a power generating apparatus with a stator means disposed within a shroud for directing a first portion of an input medium received in a direction substantially parallel to an axis of the stator for directing said received input medium to exit the stator in a direction substantially tangential to a circle of rotation about said axis, the direction of exit being substantially orthogonal with respect to said axis at an angle with respect to said axis within a range of about 85 to about 88 degrees, and a rotor receiving the medium output from the stator at an entry angle substantially tangentially directed to a circle of rotation about said axis and substantially orthogonal with respect to said axis at an angle with respect to said axis within a range of about 85 to about 88 degrees.

These and other objects, features and advantages of the present invention will become more apparent from the following description when taken in connection with the accompanying drawings which show, for the purposes of invention, plural embodiments in accordance with the present invention, and wherein:

FIG. 1 shows a two rotor apparatus with aerodynamic augmentation.

FIG. 2 shows a three rotor configuration according to the invention wherein the second and third rotors are interconnected by a planetary gear train.

FIG. 2A shows an enlarged view, in section, of a portion of FIG. 2, depicting the planetary gear train details.

FIG. 3 shows a three rotor configuration according to the invention employing a hollow shaft fixedly mounted to the second and third rotors.

FIG. 3A is a development plan view showing exemplary geometry for stator and impeller blades for FIGS. 2 and 3.

FIG. 4 is a graphical representation for a prior art rotor showing the relationship between power output of a main rotor and velocity of an ambient medium.

FIG. 5 is a graphical representation according to the invention showing the relationship between power output of a main rotor and velocity of an ambient medium as compared to a prior art device.

FIG. 6 shows geometry for a planetary gear system according to the invention.

FIG. 7 shows, schematically, a front view of Applicant's invention, as for example, FIGS. 2 and 3.

FIG. 8 shows a power take-off apparatus according to the invention wherein a large diameter rim-type electrical generator is incorporated in the hub of the main rotor.

FIGS. 9A and 9B show, according to the invention, embodiments for different dispositions of the shafts and axes.

FIG. 10 shows a power take-off according to the invention wherein the main shaft powers a hydraulic pump which serves to power an electrical generator located remotely from the pump.

FIG. 11 shows a tower-mounted power take-off apparatus according to the invention wherein the main shaft by a gear transmission means serves to provide rotation for a shaft on the ground to attach to a mechanical load.

FIG. 12 shows an apparatus configuration according to the invention wherein multiple units of power-generating apparatus are attached to a distribution configuration to provide power to an electrical power system.

Apparatus With Aerodynamic Augmentation

Turning now to the figures of the drawings wherein like elements are designated by similar reference numerals, FIG. 1 shows apparatus having dynamic augmentation comprising a shroud 1 with a conical wind deflector 2 supported therein by stator blades 3, the latter mounted within the shroud 1.

Primary or main rotor 8 may be fixedly mounted, or alternatively mounted for rotation, to main shaft 4 via members 9 at hub 10. Main shaft 4 is mounted in the conical wind deflector 2 for rotation by a bearing 5. Main shaft 4 provides power take-off.

The medium entering between the stator blades 3, impacting the blades of the main rotor 8, causes rotation of the main rotor 8 and the main shaft 4.

A secondary rotor 20 is disposed to be responsive to a portion of the medium passing exterior to the shroud 1, the latter portion of the medium impacting blades of the secondary rotor 20 to cause rotation of thereof, which rotates freely with respect to the main shaft 4 on a bearing at 20". A bearing 32' supports the rear end of main shaft 4 within the shroud 1. A second group of secondary rotor blades at 20' serve to exhaust the output of the primary rotor 8 from the space 33 within the shroud. Arrow 33' shows the direction of medium flowing within the space 33. The pitch of the blades 20' is such that the rotation imparted to the secondary rotor by the blades 20 will be sufficient to exhaust the output medium of the main rotor blades 8 from the space 33 within the shroud 1 in such a manner as to lower the pressure within the space 33 as compared to the pressure which would obtain in space 33 in the absence of the secondary rotor blades 20 and 20'.

The reduction in pressure in space 33 which attends the increase in velocity of the medium exiting space 33 as a result of the blades 20' is consonant with Bernoulli's principle.

The device of FIG. 1 may be mounted so that its shroud support 7 is rotatable about a vertical axis 45 to afford orientation of the device of FIG. 1 to assume different azimuths.

In an exemplary configuration, with the forward end of the machine opening being reduced by substantially 50%, and the air velocity increased by over 100%, the net power available to main shaft 4 is in the neighborhood of at least four times that of the designs of conventional mills lacking the structure of the invention.

With a loaded rotor speed of approximately 50% of the no load speed, a 150 M.P.H. ambient wind is readily endured without damage, that is, the top speed of the main rotor is approximately two times the speed of the ambient wind and the rear rotor speed approximately 1 ½ times the speed of the ambient wind. Peak power output is achieved at approximately 55 percent of no load speed. In one example, a highest torque is achieved at 0 RPM of the main rotor.

DETAILED DESCRIPTION OF THE INVENTION

FIG. 2 shows an embodiment of the invention wherein a shroud 1 encircles a conical wind deflector 2 which is mounted to the shroud 1 by way of a stator section 3. A main rotor 8 is mounted to a main shaft 10 by way of members 9, the main shaft 4 being rotatably mounted in the conical wind deflector 2 at a bearing 5.

The stator and rotor blades 3 and 8 may be essentially of the same configuration as those used in a reaction turbine of modern design, the multiple blades of the rotor and stator being respectively curved to provide for the flowing medium an angle of exit from the stator substantially equal to the entry angle to the rotor.

As shown, a trailing end, of the main shaft 4 is mounted in a bearing 32' at the trailing edge of the shroud 1. Main shaft 4 serves for power take-off.

The shape of the shroud 1 is aerodynamic in character, tapering at its extremity adjacent secondary rotor 20 at a point 1' such that a tangent to the surface of the shroud at 1' makes an angle with axis 70, an exemplary value for which is about 14 degrees. The shape of shroud 1 shown in FIG. 2 and, as described, provides medium 40 with a maximum velocity as it impacts secondary rotor 20, in accordance with the invention.

Shroud 1 is supported by shroud support 7 which is rotatably adjustable about a vertical axis 45 and a horizontal axis 46. The degrees of freedom thus provided accommodate changing direction of the apparatus to maximize output, as for example, if mounted on an air, sea or land vehicle.

A secondary rotor 20 is rotatably mounted to the main shaft 4 at a bearing 22 by means of members 24. A hollow shaft 25 is fixedly mounted to the hub 22 of the secondary rotor 20 and, at its leading end, towards cone 2, has affixed thereto a section of a planetary gear assembly 50 which serves to transmit rotation from the hollow shaft 25 to a tertiary rotor 27. Alternatively, secondary rotor 20 may be fixed to main shaft 4.

FIG. 2 shows rotation of main shaft 4 and hollow shaft 25 to be clockwise as viewed from the conical deflector 2; however, according to the invention, counterclockwise rotation may be effected for either or both rotors 8 and 20 by appropriate setting of the pitch of the respective rotor blades by expedients well known to those skilled in the art. The hollow shaft 25, bearing 22, rotor 27, hub 27', planetary gear assembly 50 and framing member 52 are shown only in section in FIG. 2.

The configuration of the planetary gear assembly 50 will be better understood from a consideration of FIG. 2A wherein main shaft 4 has mounted upon it the hollow shaft 25 with planetary gear assembly 50 affixed to the leading end thereof. A stub shaft 51 is mounted in a framing member 52 which in turn is fixed with respect to the shroud 1 by struts such as 52' spaced to allow passage of the medium from space 33 to tertiary rotor 27 as shown by arrow 52". A pinion 53 mounted to the stub shaft 51 engages a ring gear 54, the ring gear 54 being integral with the hollow shaft 25. At the other end of the stub shaft 51 is affixed a second pinion 55 which engages a ring gear 56, the ring gear 56 being integral with the tertiary rotor 27. The ring gear 56 and tertiary rotor 27 are supported for rotation by a bearing on the hollow shaft 25 at a hub 27'. It will be appreciated that the pitch radius $R_{53}$ bears a relation to the pitch radius $R_{55}$ such that the speed of rotation in rpm of the driven rotor 27 is greater than the speed of rotation of hollow shaft 25 for the purpose of lowering pressure in space 33.

Alternative relationships of pitch radius of the two ring gears 54 and 55 when considered with the configuration of the blades of tertiary rotor 27 may be used, the end result being the same, namely, that pressure of the medium in space 33 is reduced compared to the pressure in space 33 absent rotor 27.

Alternative equivalent power transmission apparatus for delivering power to tertiary rotor 27 from secondary rotor 20 will be apparent to those skilled in the art and falls within the ambit of the invention.

The cross sectional area of the stator 3 and of the rotor 8 presented to the moving medium is approximately 50% of the enclosed area at the leading end, the cross-sectional area being reduced by the nose cone 2 to cause a restriction in the frontal area, thereby increasing velocity of the medium through the stator 3 and increasing the rotational velocity of the rotor 8 and concomitantly increasing the power imparted to the main shaft 4.

In operation, medium at 40, FIG. 2, passing outside the shroud 1 and engaging the secondary rotor 20 serves to transmit rotation to the hollow shaft 25 which, through the planetary gear assembly 50, imparts a speed of rotation to the tertiary rotor 27 which is greater than the speed of rotation of the secondary rotor 20 thereby accelerating a medium which has passed through the primary rotor 8 to exhaust the space 33, lowering the pressure in space 33 within the shroud 1. Arrow 33' shows the general direction of flow of medium in space 33. The assist from such a lowering of the pressure of the medium in space 33 allows the rotor 8 and main shaft 4 to rotate at a speed which is greater than that which would be possible in the absence of the secondary rotor 20, hollow shaft 25, planetary gear assembly 50 and tertiary rotor 27.

When velocity of the input medium at 41 is low, startup of the main rotor 8 is enhanced, that is, main rotor 8 will be able to begin and maintain rotation at low levels of velocity of medium 41 which levels, absent the invention, would not have produced or maintained rotation of main rotor 8.

It will be observed from a consideration of FIG. 2 that, as there disclosed, the outside diameter of the shroud 1 is substantially less than the overall dimension of the apparatus of FIG. 2 as measured from the cone 2 to the trailing end of the main shaft 4, and, together with its supports 3, 5, 52' and 32' serves as a structure which is essentially a unitary and rugged design, thereby affording increased resistance to damage at high flow rates of the medium 41 as compared to prior art structures of comparable power output under comparable operating conditions.

FIG. 3 shows another embodiment of the invention having a shroud 1, herein referred to as a leading shroud, with a conical wind deflector 2 supported centrally therein by stator blades 3, the latter mounted within the shroud 1. The cross sectional area of the stator 3 and of the rotor 8 presented to the moving medium 41 is approximately 50% of the enclosed area at the leading end, the cross sectional area being reduced by the conical wind deflector 2 to cause a restriction in the frontal area, thereby increasing the rotational velocity of the main rotor 8 and greatly increasing the power imparted to the main shaft 4.

Main shaft 4 is mounted for rotation in the conical wind deflector 2 by a bearing 5. Main rotor 8 is mounted fixedly by way of members 9 and hub 10 to the main shaft 4. Main shaft 4 may provide a power takeoff.

A secondary shroud 6, herein referred to as a trailing shroud, is spaced from the leading shroud 1. The shape of the leading and trailing shrouds is tapered toward the axis 70 of main shaft 4 to effect lowering of the pressure along trailing shroud 6 and consequently increase the velocity of the air which impacts the secondary rotor blades 20. A shroud support, shown schematically at 7, serves as a mounting for both shrouds 1 and 6, maintaining the two shrouds 1 and 6 in substantially fixed spaced relationship with respect to each other.

The trailing shroud 6 is tapered aerodynamically, in a manner similar to that described in connection with FIG. 2 such that at the point 6', a tangent to the surface of the shroud 6 may make an angle which may be substantially of the order of about 14 degrees with respect to the axis 70.

A secondary rotor 20 is disposed to receive medium passing outside the leading shroud 1 and the trailing shroud 6. The secondary rotor 20 is shown as disposed within a tertiary shroud 21, the tertiary shroud being supported by the shroud support 7. The tertiary shroud 21 is an optional feature of the invention. The invention may be practiced with or without the tertiary shroud 21.

The hub 23 of the second rotor 20 is rotatably mounted to the main shaft 4 by a bearing 22, the hub 23 of the secondary rotor being connected to the secondary rotor by spoke members 24. A hollow shaft 25 is fixed to the hub 22 and is supported by a bearing 26 so that the hollow shaft 25 rotates in response to movement by the secondary rotor 20 independently of the rotation of main shaft 4.

The bearing 26, disposed, as shown in FIG. 3, between the main rotor 8 and second rotor, 20, supports a tertiary rotor 27 by means of supporting wall 28 at the leading part of trailing shroud 6.

A bearing 26' supports the trailing part of the hollow shaft 25 within the trailing shroud 6.

The trailing shroud 6 is spaced with respect to the leading shroud 1 to provide an aperture 29' between the trailing edge 29 of the leading shroud 1 and the leading edge 30 of the trailing shroud 6 such that a medium which has passed through the stator section 3, and the main rotor 8, may exit by way of the aperture 29' between 29 and 30 having passed through the tertiary rotor 27. Supporting wall 28 serves among other things to improve the structural rigidity of the trailing shroud 6 and attendant apparatus.

It will be observed from a consideration of FIG. 3 that, as there disclosed, the outside diameter of the shrouds 1 and 6 are substantially less than the overall dimension of the apparatus of FIG. 3 as measured from the cone 2 to the trailing end of the main shaft 4, and, together with its supports 3, 5, 52' , 28 and 32, serves as a structure which is essentially unitary and rugged in design, thereby affording increased resistance to damage at high flow rates of the medium 41.

The tertiary rotor 27 may comprise a disc 27' with blades 27''. The tertiary rotor 27 may take the form, alternatively, of a radial exhaust or squirrel cage configuration.

The operation of the device of FIG. 3 is as follows. Input medium 41 divides at the forward edge of shroud 1, a first portion entering the shroud 1 between, the stator blades 3 and a second portion proceding around the outside of the shroud 1 as shown at arrow 40. Medium proceeding around the leading shroud 1 at 40 is joined at 42 by medium which has passed through the main rotor 8 and the tertiary rotor 27 by way of the aperture 29' defined by 29 and 30. The increased velocity of the medium flowing past the leading and trailing shrouds 1 and 6, as provided in part by the assist to the medium afforded by tertiary rotor 27, creates a low pressure area at 42. The aperture area 29' on the output side tertiary fan blades 27'' between points 29 and 30 and 42 being at low pressure serves to increase the efficiency of tertiary rotor 27. The medium, at 42, which impacts the secondary rotor 20, is thus a composite medium made up of medium received exterior to leading shroud 1 shown at 40 and medium received as output from main rotor 8 via tertiary rotor 27 through aperture 29'. The energy captured by the rotor 20 is transferred to tertiary rotor 27 affixed to the inner end of the hollow shaft 25 rotating within wall 28. The latter shaft 25, is freely rotating with respect to main shaft 4, as shown. As a result of the impact of the composite medium on the secondary rotor 20, the blades of the secondary rotor 20, the hub 23 and hollow shaft 25 are caused to rotate, thereby imparting rotation to members 27' and tertiary rotor 27.

Inasmuch as the pressure is lower in space 33, by the action of secondary rotor 20 and tertiary rotor 27, the operation of the main rotor 8 is enhanced, resulting in an increased capability for start-up at lower velocities of ambient medium and an increased rotational velocity resulting at the main shaft 4.

With this configuration of the invention, air which flows through and a significant portion of air which flows adjacent the machine is used to provide energy, the energy extracted by the rotor 20 serving to increase the effectiveness of the main turbine rotor 8 through increased velocity of the working medium passing through rotor 8 due to the lower pressure in space 33.

Under conditions of very light movement or low velocity of input or ambient medium, shown by arrow 41, main rotor 8 is induced to commence and maintain rotation, when, absent the secondary and tertiary rotors and attendant structure of the invention, main rotor 8 would remain stationary. Because of the inherent high torque characteristics of a reaction turbine, the apparatus of the invention will start under load and respond very quickly to varying winds.

With regard to power output versus wind speed, a further result of the invention is a relatively constant power output curve for any given windspeed, that is, over a broad range between 20–80% of no load speed, as loading is increased, rpm decreases and torque increases as a reciprocal with horsepower remaining relatively constant.

Start up is accomplished early and easily at very low wind speeds.

It will be apparent from the foregoing, that the apparatus of the invention is capable of operating effectively over a wide range of ambient medium or wind speeds, offering a reliable operational device at high velocities of ambient medium.

As shown in FIG. 3, the rotation of the main shaft 4, and hollow shaft 25 is shown by arrows 4' and 25' respectively to be clockwise, as viewed from the conical wind deflector 2. However, the invention is not limited to such a rotation configuration. For example, the pitch of the blades of secondary rotor 20 may be configured to produce counterclockwise rotation of the secondary rotor and hollow shaft with respect to a clockwise rotation of main shaft 4. Similarly, the pitch of the rotor blades of the tertiary rotor 27 may be configured to impart either a counter clockwise rotation to the air exiting the aperture 29' and through the tertiary rotor blades 27.

The device of FIG. 3 may be mounted so that its shroud support 7 is rotatable about a vertical axis 45 and horizontal axis 46 as described in connection with FIG. 2.

FIG. 3A shows, schematically, a development of the outer periphery of the blades of the stator 3, main rotor 8, secondary rotor 20 and tertiary rotor 27, as employed in FIGS. 2 and 3, for the purpose of showing exemplary geometry including blade shapes and the relative pitches in angularity of the individual blades according to the invention. FIG. 3A thus depicts essentially the ends and/or respective cross-sections of the blades of the stator 3 and respective rotors 8, 20 and 27. With the direction of flow of the medium shown by the arrow 41 as substantially parallel to the axis 70 of the main shaft 4, the leading edge 3a of the stator blade 3' lies in a plane y—y designated by the line 3b, substantially orthogonal with respect to the axis 70.

In FIGS. 2, 3 and 3A, air entering the shroud 1 at plane x—x is funneled by the inner surface of the shroud 1 and the conical deflector 2 into contact with the stator blades 3, which funneling creates a venturi effect so that the velocity of the air at plane y—y may be expressed as follows:

$$V \text{actual} = C_v 2g \left( h_+ - \frac{P_o}{\rho} \right)$$

where $C_v$ is the velocity coefficient, to gravity, $h_-$ is the total head at plane x—x, $P_o$ is the static gauge pressure at plane y—y and $\rho$ is the mass density. [See Sabersky, *Fluid Flow*, 2d ed., New York, The Macmillan Company, 1971].

As demonstrated by the above formula, the air entering stator blades 3 is moving at a greater velocity than the air that enters the shroud 1 at plane x—x. Accordingly, the higher velocity air is then deflected by the stator blades 3 which are in concave-convex form, i.e., similar to turbine blades as shown in FIG. 3A. The deflected air which is now moving essentially in the direction of the plane of rotation of the rotor, is then passed to the rotor blades 8 wherein said air acts as the driving force against the blades 8.

It will be noted that a medium exiting a trailing edge of the stator blade 3', indicated by the point 3d, does so in a direction substantially parallel to a tangent 3c to the curved surface of stator blade 3', which tangent 3c is substantially orthogonal with respect to axis 70 making an angle A with respect to the axis 70 of about 85–88 degrees, with an exemplary figure of 87 degrees. The direction of the medium exiting at 3d is substantially tangential to a circle of rotation about axis 70.

The main rotor blade 8' is of turbine-like cup cross-section partaking of the nature of a semi-circle, substantially. The entry angle of a medium entering the main rotor 8', at an edge denoted by the point 8d, may be substantially equal to the exit angle of the stator and accordingly may be also substantially orthogonal with respect to axis 70 and is, namely, the angle B, which may fall within a range of about 86–88 degrees with an exemplary figure of 87 degrees. The trailing edges 8e of the main rotor blades 8 lie in a plane designated by line 8f which plane is substantially orthogonal to axis 70. The exit angle of medium exiting the rotor blade 8' shown at C may also make an angle with respect to axis 70 falling within a range of about 85–88 degrees with an exemplary figure of 87 degrees.

The cross-section configuration of the blades of the stator 3 and rotor 8 may thus be considered as curvilinear in accordance with conventional turbine practice.

In accordance with the invention, the number of blades in the stator is made different from the number of blades in the rotor, thereby contributing to quiet operation.

The particular angular magnitude and curve shapes for rotor 3 and stator 8 described above are exemplary only and may take other magnitudes and shapes without departing from the invention.

The direction of the incoming medium 41 is thus changed by its impact with the curved blades 3' of stator 3 to a direction which is substantially tangent to a circle of rotation about axis 70 described, for example, by a point such as 8d on a leading or entry edge of a blade 8' of main rotor 8.

For the blade 20 of the secondary rotor, a chord 20a is shown drawn through the edges of the blade 20, the radius 20b of the chord 20a making an angle D with respect to the axis 70 which may be of the magnitude of about 20–40 degrees with an exemplary angle of 20 degrees shown. Blade 20 may have a planar cross section defined, for example, by the chord 20a, or alternatively may have curvature defined, for example, by curve 20c.

The tertiary rotor 27 is shown as having a chord 27a drawn between its two edges, a radius 27b for the chord 27a making an angle E with respect to the axis 70 which may lie within a range of about 20–45 degrees with an exemplary angle of 45 degrees shown. Blade 27 may have a planar cross-section defined, for example, by chord 27a, or alternatively may have curvature defined, for example by curve 20c. The shape of blade 27 is to effect movement of the medium radially with respect to axis 70 so that the medium is induced to exit the aperture between edges 29 and 30.

Arrows 20r and 27r show exemplary directions of rotation for the rotors 20 and 27, respectively while the arrows 41, 42 and 33' show the directions of flow for the medium approaching tee rotors 20 and 27, respectively, although the directions of rotation of the respective rotors in the practice of the invention may be other than those shown if desired.

The secondary and tertiary rotor blades 20 and 27 may be configured in axial, radial or squirrel cage form.

FIG. 4 shows the relationship between the power output of a main rotor configured without secondary and tertiary rotors and attendant structure as shown in FIGS. 2 and 3.

Figure 4:
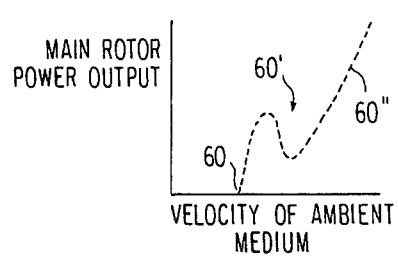
FIGS. 4 and 5 show in graphical form an effect of the invention.

Under such circumstances a rotor without the assist afforded by the invention, is essentially a prior art rotor. At low velocities of the ambient medium, the rotor is static. As the velocity of the ambient medium at 41 increases, a point 60 will be reached where rotor 8 begins to rotate and, as the ambient medium increases in velocity, power output of the rotor will increase passing through a stall phase as shown schematically at 60' followed by a rise 60''. The curve shown in FIG. 4 is representative of those shown in FIG. 18, Page 22, of "Fabrication and Test Technical Report: Bearingless Rotor Wind System," published by Dynergy Systems Corporation, Los Banos, CA: Excerpt from DOE/UTRC Technical Report dated 4 Feb. 1981.

Figure 2:
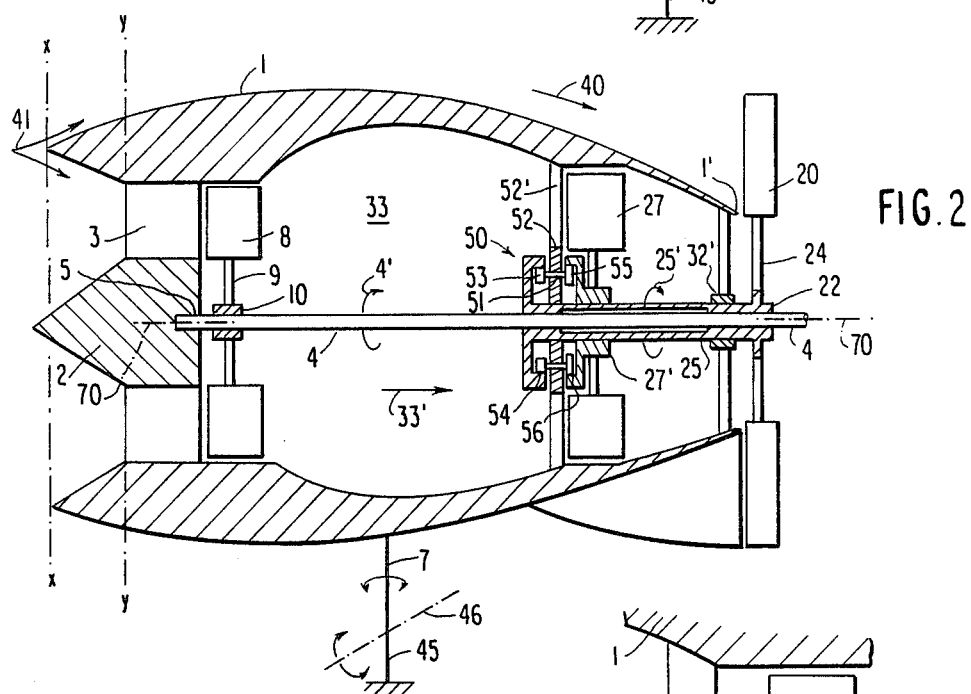
Figure 3:
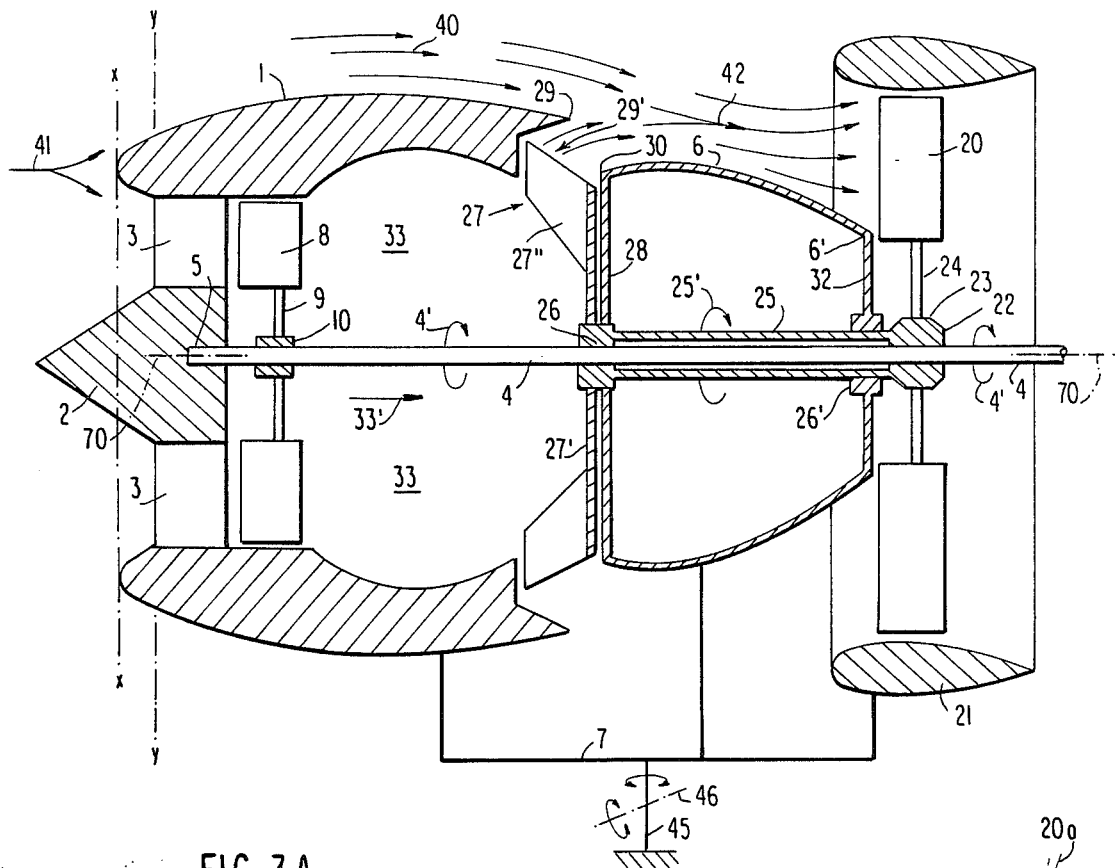
Figure 3A:
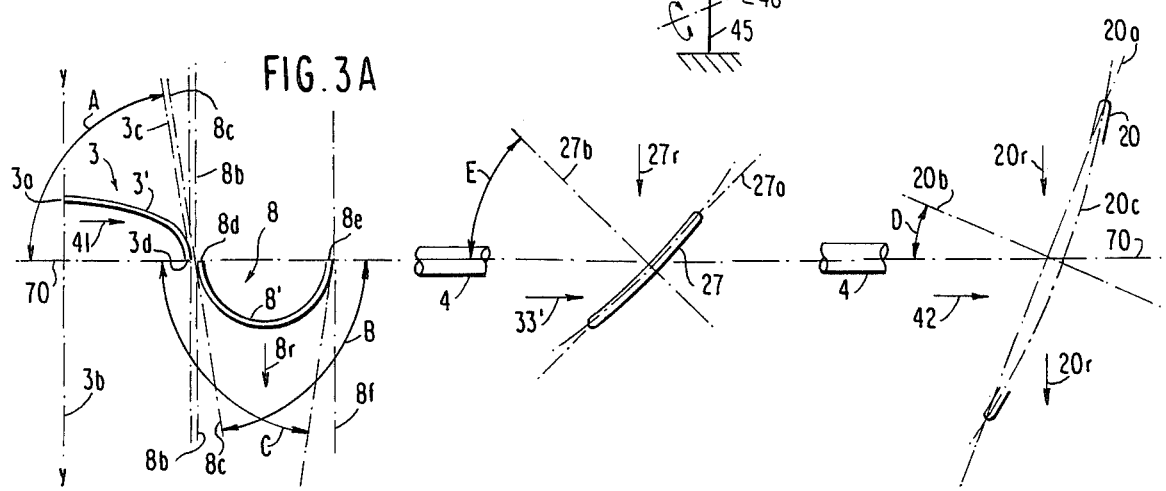
Figure 5:
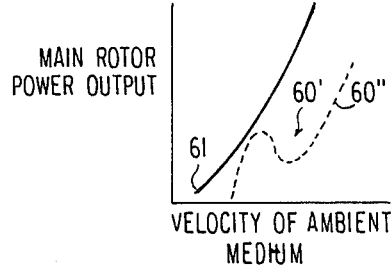

This is to be contrasted with FIG. 5 representing a power characteristic according to the invention as disclosed in FIGS. 2 and 3 wherein, by virtue of the teachings of the invention, the point at which rotation begins has been shifted to the left from point 60 of the prior art to point 61 so that rotation begins for the main rotor 8 at a lower velocity of the ambient medium. Moreover, the stall phase exhibited by the prior art is absent, replaced by a continually increasing power characteristic.

Figure 2A:
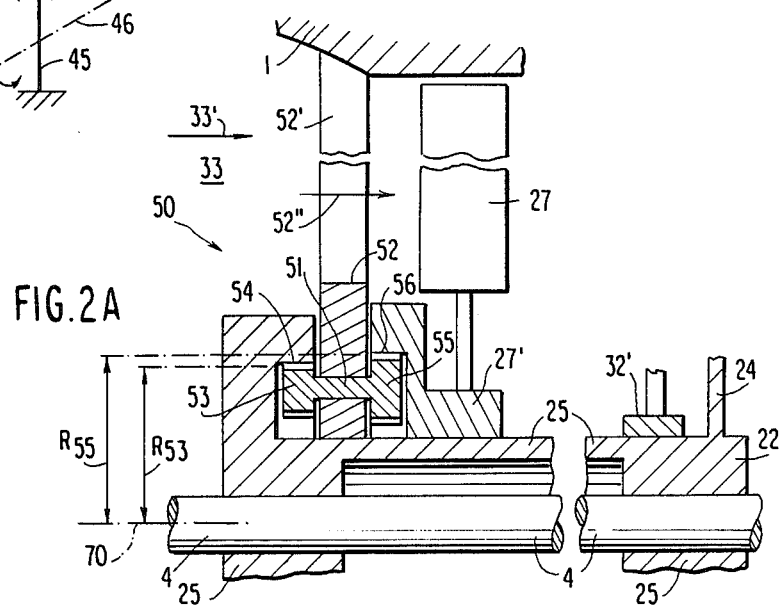
Figure 6:
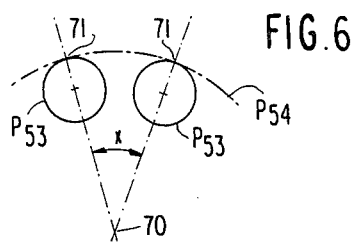

While in FIG. 2A only a single example of a planetary gear configuration 51, 53 and 55 has been shown, according to the invention, a plurality of such planetary pinions disposed about axis 7 shown in FIGS. 2 and 3, may be employed as desired. In this regard, FIG. 6 shows plural pitch circles $P_{53}$ for plural planetary gears 53, each circle being tangent at a point 71 to a pitch circle $P_{54}$ of a ring gear 54, the reference numeral 70 representing the center of the main shaft 4 at axis 70 of FIG. 3. It will be appreciated that the magnitude of the angle x will be different, depending upon the number of planetary gears 53 employed and, upon a consonant number of stub shafts 54 and planetary gears 55 to engage the ring gear 56.

Figure 7:
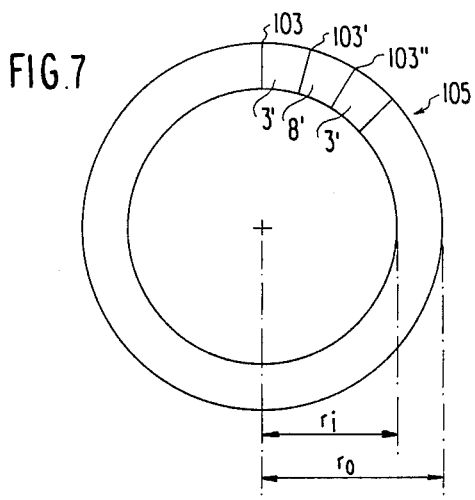

According to another feature of the invention, the inner radius of the blades 3' and 8' of the stator 3 and rotor 8 respectively is related to the outer radius of the stator blades 3' and rotor blades 8' such that the area swept by the rotor and stator blades, as shown in FIG. 7 is equal to the area of the circle defined by the inner edges of the rotor and stator blades. Put another way, $$(r_o)^2/2 = (r_i)^2$$

substantially. This results in a relationship wherein $r_o$ is substantially equal to $$r_i \sqrt{2} \text{ or } 1.414 r_i$$

Figure 8:
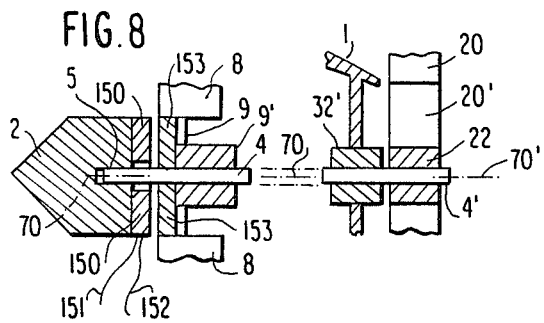

FIG. 8 shows that the invention may employ two stub shafts 4 and 4', or their equivalent, in lieu of a single main shaft 4. As there shown, the main shaft 4 comprises a stub shaft which may be mounted in the bearing 5, the conical wind deflector 2 serving as support therefor. Mounted within the conical wind deflector 2 is an electrical stator winding 150 with output leads 151 and 152 leading to a remote electrical load. The main rotor 8 carried by members 9 mounted to a hub 9' carrying a bearing is rotatable about the main shaft 4 which, in this embodiment may comprise a stub shaft.

Mounted to the member 9 is a rotor 153 of a large diameter rim type electrical generator, which may be of the magnetic type, serving to generate within the electrical stator 150 electromotive forces resulting in output voltages on leads 151 and 152 as a result of the rotation of the main rotor 8, with attendant electrical capability for energy transmission.

Figure 1:
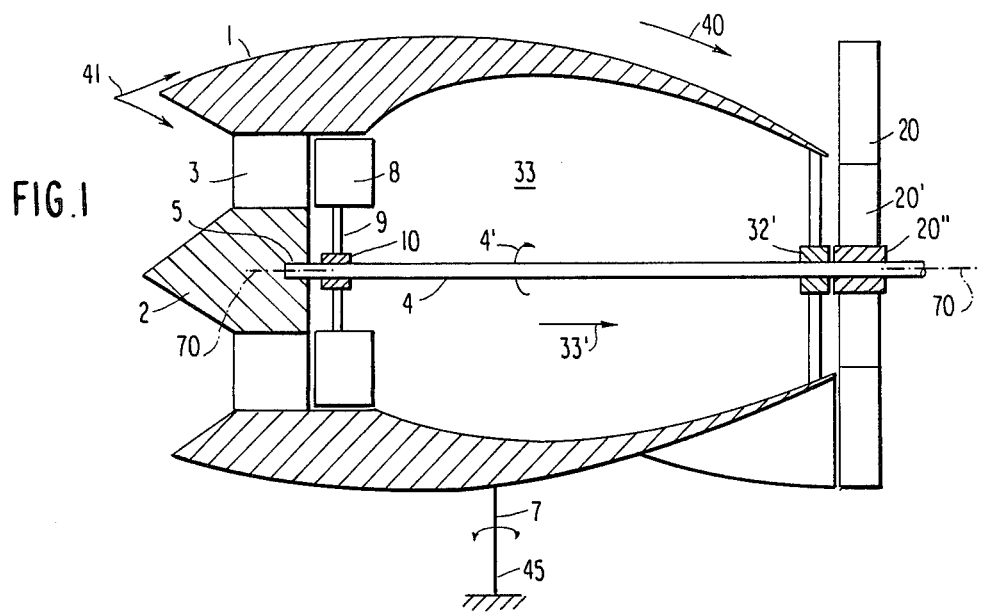

In this embodiment, it will be appreciated that the secondary rotor 20, as for example in FIG. 1, may be mounted to a stub shaft 4' by means of hub 22 and members 24, the stub shaft being fixedly positioned by a bearing 32' mounted to the shroud 1.

As shown in FIG. 8, stub shafts 4 and 4' may be coaxial or, alternatively, the axes 70 and 70' may be both nonparallel and non-intersecting according to the invention.

Figure 9A:
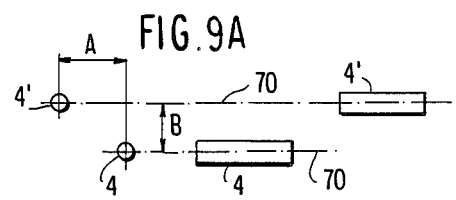
Figure 9B:
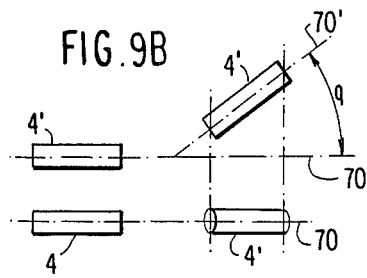

As shown in FIG. 9A, according to the invention the stub shaft 4' may be laterally displaced by a distance A and/or vertically displaced by a distance B with respect to stub shaft 4 or, alternatively, as shown in the top and side views of FIG. 9B, disposed by an angle q along an axis 70', or all three, laterally, vertically and angularly disposed as circumstances such as spatial or other requirements may dictate.

Figure 10:
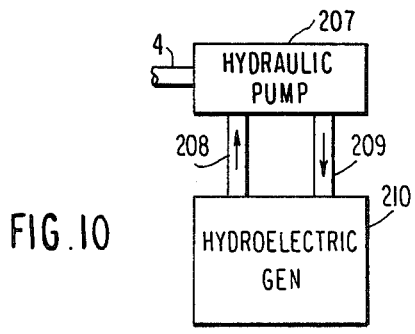

In FIG. 10, power take-off may be effected by a hydraulic pump 207 actuated by rotation of main shaft 4, the hydraulic pump 209 receiving input by means of 208 and producing output on 209, pipes 208 and 209 being connected to an hydraulic/electrical generator 210 located at a remote point.

Figure 11:
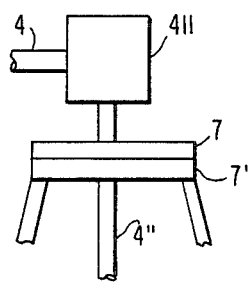

FIG. 11 shows a mechanical transmission system wherein horizontal main shaft 4, which makes use of a transmission 411, and which may be configured as bevel gears or the like. Transmission 411 is mounted to shroud support 7 which in turn is rotatably mounted with respect to the top of a tower 7' as shown. Transmission 411 may actuate a vertical shaft 4" extending to a remote mechanical load which may be at a remote location when the apparatus of the invention is mounted on the top of a tower structure.

Figure 12:
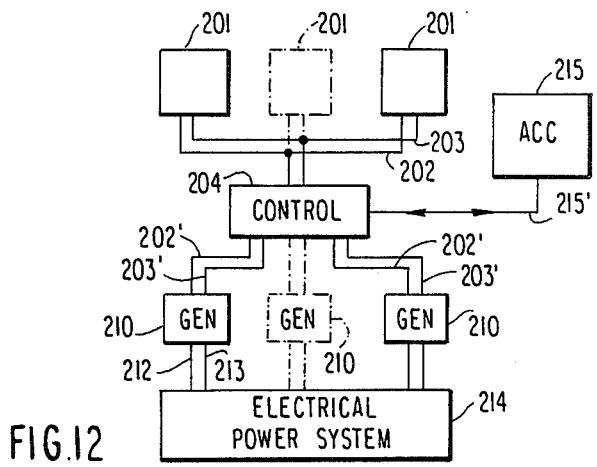

FIG. 12 shows a system wherein multiple units 201, according to the invention as disclosed in any of FIGS. 2 and 3, communicate by means of energy transmission lines 202 and 203 with a control unit 204. The control unit 204 serves to effect distribution of energy received from the multiple units 201 to one or more of the generators 210 on lines 202' and 203'. Transmission lines 202 and 203, 202' and 203' as shown in FIGS. 9-11 may be electrical, mechanical or hydraulic as shown in FIGS. 9-11. Each of the generators 210 serve by means of electrical outputs 212 and 213 as input to an electrical power system 214. Where hydraulic transmission is used, an accumulator 215, which may comprise a pressure tank unit by way of lines shown schematically by 215' so that medium may be transmitted to the accumulator 215 or retrieved therefrom under the control of the control unit 204, depending upon the required input to the several apparatus 210 to satisfy the load requirements of the electrical power system 214.

Alternatively, a mechanical accumulator may be used, for example, one in which the system during storage elevates one or more weights which, in output mode are lowered to generate rotation of an electrical generator for example by use of a rack and pinion.

Any number of the apparatus 201 and generators 210 may be employed as depicted by the dashed line in FIG. 12.

While I have shown and described several embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A method for producing mechanical rotation from a flowing medium comprising a first portion and a second portion, said first portion and said second portion being mutually exclusive, the method comprising the steps of
   rotating a first rotor in response to said first portion of said medium to produce output medium from said first rotor,
   rotating a second rotor in response to said second portion of said medium,
   rotating a third rotor in response to rotation of said second rotor,
   reducing the pressure of said output medium in response to rotation of said third rotor to effect augmentation of speed of said output medium by performing one of
      increasing the speed of rotation of said third rotor with respect to the speed of rotation of the second rotor and rotating the second rotor in response to at least a portion of said output medium.

2. A method for producing mechanical rotation from a medium flowing parallel to an axis said medium comprising a first portion and a second portion, said first portion and said second portion being mutually exclusive, said method comprising the steps of
   directing said first portion of the medium in a direction substantially tangential to a circle of rotation about said axis,
   imparting rotation to a first rotor employing said first portion of said flowing medium to produce an output medium,
   imparting rotation to a second rotor employing said second portion of said medium and employing at least a portion of said output medium from said first rotor,
   imparting rotation to a third rotor in response to rotation of said second rotor and
   accelerating said portion of said output from said first rotor in response to rotation of said third rotor.

3. A method according to claim 2, wherein the step of directing is further characterized by the medium making an angle with respect to said axis of magnitude within a range of about 85 to 88 degrees.

4. A method for producing mechanical rotation from a flowing medium comprising a first portion and a second portion, said first portion and said second portion being mutually exclusive, the method comprising the steps of
   directing said first portion of the medium in a direction substantially tangential to a circle of rotation about an axis,
   rotating a first rotor employing said first portion of said medium,
   rotating a second rotor employing said second portion of said medium, and performing one of
   rotating a third rotor at a speed of rotation different from the speed of rotation of said second rotor and impacting said second rotor with at least a portion of said output medium.

5. A method according to claim 4, further comprising the step of
   lowering the pressure of at least a portion of said second portion of said medium in response to said output medium.

6. A method for producing mechanical rotation from a flowing medium comprising a first portion and a second portion, said first portion and said second portion being mutually exclusive, the method having an anti-stall characteristic of continually rising power output with rising speed of said flowing medium and comprising the steps of
   rotating a first rotor employing said first portion of said flowing medium to produce an output medium,
   rotating a second rotor employing said second portion of said flowing medium, and performing one of
   accelerating output medium from said first rotor in response to rotation of a third rotor at a speed of rotation greater than the speed of rotation said second rotor and impacting said second rotor with at least a portion of said output medium.

7. A power generating apparatus receiving a flowing medium in a direction substantially parallel to an axis said medium comprising a first portion and a second portion, said first portion and said second portion being mutually exclusive, said apparatus comprising
   a shroud with a trailing edge, a stator means disposed within the shroud and mounted thereto for directing said first portion of said medium in a direction substantially tangential to a circle of rotation about said axis, a main rotor means for receiving said substantially tangentially directed first portion of said medium from said stator to produce an output medium and mounted on a main shaft means, the main rotor means being rotatably mounted with respect to the stator means, a secondary rotor means rotatably mounted with respect to the shroud for actuation by said second portion of said medium, a tertiary rotor means receiving as input nn output medium from said main rotor, and one of means for imparting rotation to said tertiary rotor means in response to rotation of said secondary rotor means at a speed of rotation different from the speed of rotation of the secondary rotor means and means for impacting said secondary rotor means with at least a portion of said output medium.

8. An apparatus according to claim 7, wherein the said tertiary rotor means comprises a hollow shaft means fixedly mounted to said second rotor means and concentric to said main shaft means.

9. An apparatus according to claim 7, further comprising means for transmitting power from said main rotor means in one of mechanical, hydraulic and electrical form.

10. Apparatus according to claim 9, further comprising an energy accumulating means for receiving energy from said means for transmitting and for outputting energy to a load.

11. A system comprising multiple apparatuses according to claim 7, and further comprising plural electrical power generating units, and means for selectively actuating each of said electrical power generating units in response to actuation of each of said multiple apparatuses.

12. A power generation apparatus in accordance with claim 7, wherein said means for imparting rotation to said tertiary rotor means comprises means for imparting a rate of rotation to the tertiary rotor means greater than the rate of rotation of the secondary rotor means.

13. A power generation apparatus in accordance with claim 7, wherein the means for imparting rotation to the tertiary rotor means comprises a planetary gear system.

14. An apparatus for generating power from a moving medium and having at least a first shroud means, a stator means fixedly mounted within the first shroud means and receiving at least a portion of said moving medium, a main rotor means mounted for rotation with respect to the first shroud means and receiving output from said stator means to produce an output medium within said shroud means, a second rotor means mounted for rotation with respect to said first shroud means and impacted by a second portion of said moving medium which flows exterior to said first shroud means, and means for reducing the pressure of said second portion of said moving medium in a location exterior to said first shroud means in response to said output medium and to said second rotor means.

15. An apparatus according to claim 14, wherein the said means for reducing comprises an aperture in said shroud through which at least a portion of said output medium exits said shroud to join at least a portion of said second portion of said medium.

16. An apparatus according to claim 14, wherein the said means for reducing comprises tertiary rotor means responsive to the secondary rotor means for accelerating said portion of the output medium.

17. A power generating apparatus comprising a leading shroud having a trailing edge, a stator means fixedly mounted with respect to the leading shroud, main rotor means mounted within the leading shroud for rotation with respect to the stator means by means of a main shaft, a trailing shroud having a trailing edge and a leading edge, the leading edge of the trailing shroud being spaced from the trailing edge of the leading shroud, secondary rotor means disposed proximate the trailing edge of the trailing shroud and rotatable with respect to the trailing shroud, and tertiary rotor means receiving at least a portion of a medium received as output from the main rotor means for transmitting at least a portion of said medium between the trailing edge of the leading shroud and the leading edge of the trailing shroud to impact said second rotor in response to rotation of the secondary rotor means.

18. A power generating apparatus according to claim 17, wherein said tertiary rotor means comprises a hollow shaft surrounding the main shaft, the hollow shaft being responsive to rotation of the secondary rotor means, and multiple blades of the tertiary rotor means being mounted to a hub surrounding the main shaft and responsive to rotation of said hollow shaft.

19. A power generating apparatus in accordance with claim 17, further comprising a shroud support means fixedly mounted to the leading shroud and trailing shroud for mounting the trailing shroud in fixed relation to the leading shroud.

20. A power generating apparatus in accordance with claim 19, further comprising a tertiary shroud surrounding the secondary rotor, the tertiary shroud being fixedly mounted to the shroud support.

21. A power generating apparatus receiving a medium and having an anti-stall characteristic of substantially continually rising power output with rising velocity of said medium comprising a shroud and a trailing shroud means spaced from said shroud, a stator means disposed within the shroud and mounted thereto for receiving a first portion of said medium, a main rotor means for receiving said first portion of said medium as output from said stator and mounted to a main shaft means, the main rotor means being rotatably mounted with respect to the stator means, a secondary rotor means rotatably mounted with respect to the shroud and proximate the trailing shroud means for actuation by a second portion of said medium exterior to the shroud, a tertiary rotor means receiving as input an output from the main rotor for exhausting at least a portion of said output between said shroud and said trailing shroud means to impact said second rotor means, and means for imparting rotation to said tertiary rotor means in response to rotation of said secondary rotor means.

22. A power generating apparatus in accordance with claim 21 wherein the said trailing shroud means is configured aerodynamically to make an acute angle with respect to said axis to increase the velocity of the said second portion of said medium as it impacts the secondary rotor.

23. A power generating apparatus in accordance with claim 21, wherein said main rotor means has blades to sweep a predetermined area, and the apparatus having a wind deflector means disposed central to said stator means and having a cross section orthogonally disposed with respect to an axis of said main shaft means, the area of the said cross section being substantially equal to the predetermined area swept by the blades of the main rotor means.

* * * * *